Oct. 14, 1947. H. S. GAY ET AL Re. 22,927

TIMBER SETTING MACHINE

Original Filed Feb. 1, 1945 3 Sheets-Sheet 1

Inventors
HARRY S. GAY &
T. V. MAYNARD

By Munn, Liddy & Glascock
Attorneys

Oct. 14, 1947. H. S. GAY ET AL Re. 22,927
TIMBER SETTING MACHINE
Original Filed Feb. 1, 1945 3 Sheets-Sheet 2
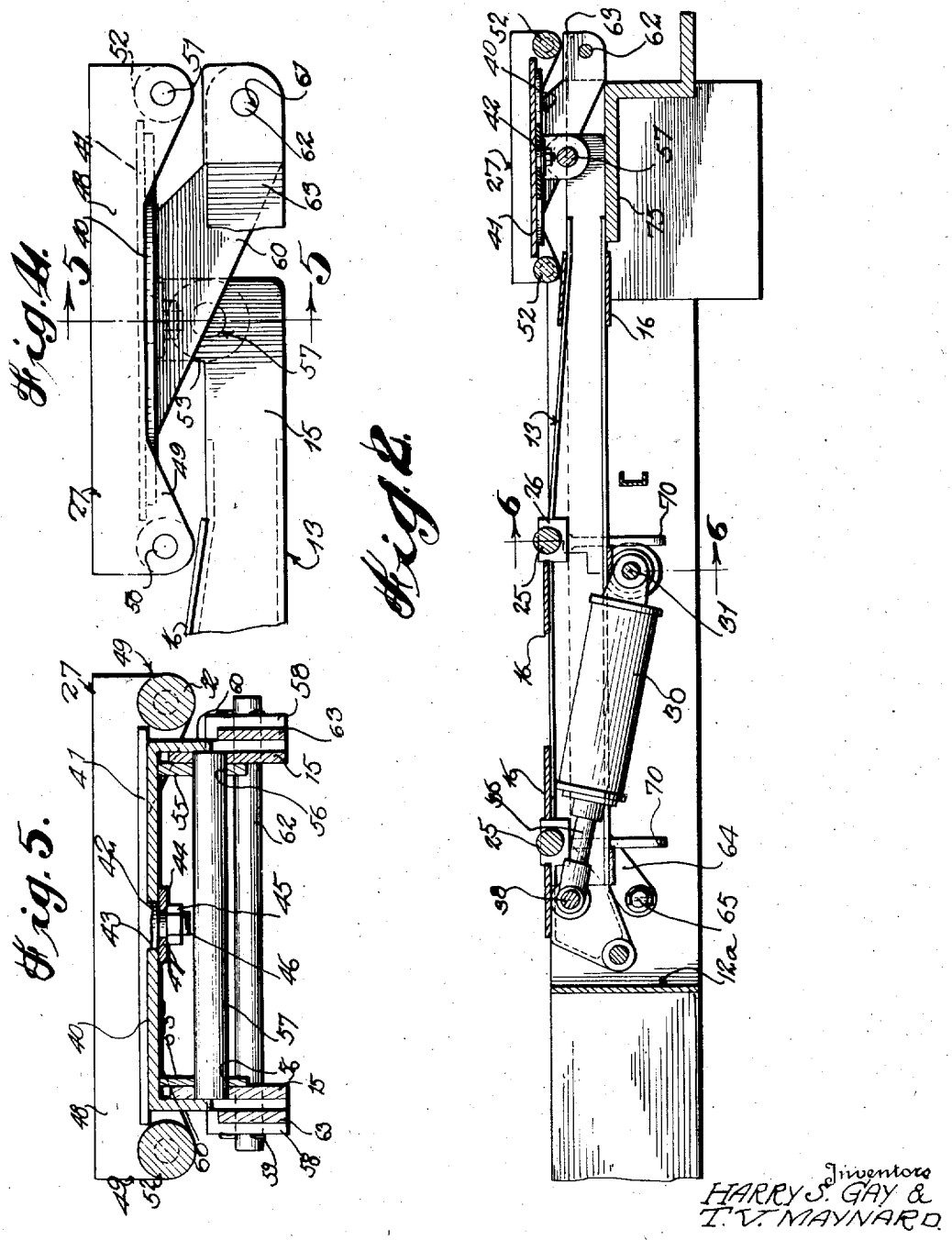
Inventors
HARRY S. GAY &
T. V. MAYNARD
By Munn, Liddy & Glascock
Attorneys Oct. 14, 1947. H. S. GAY ET AL Re. 22,927
TIMBER SETTING MACHINE
Original Filed Feb. 1, 1945 3 Sheets-Sheet 3
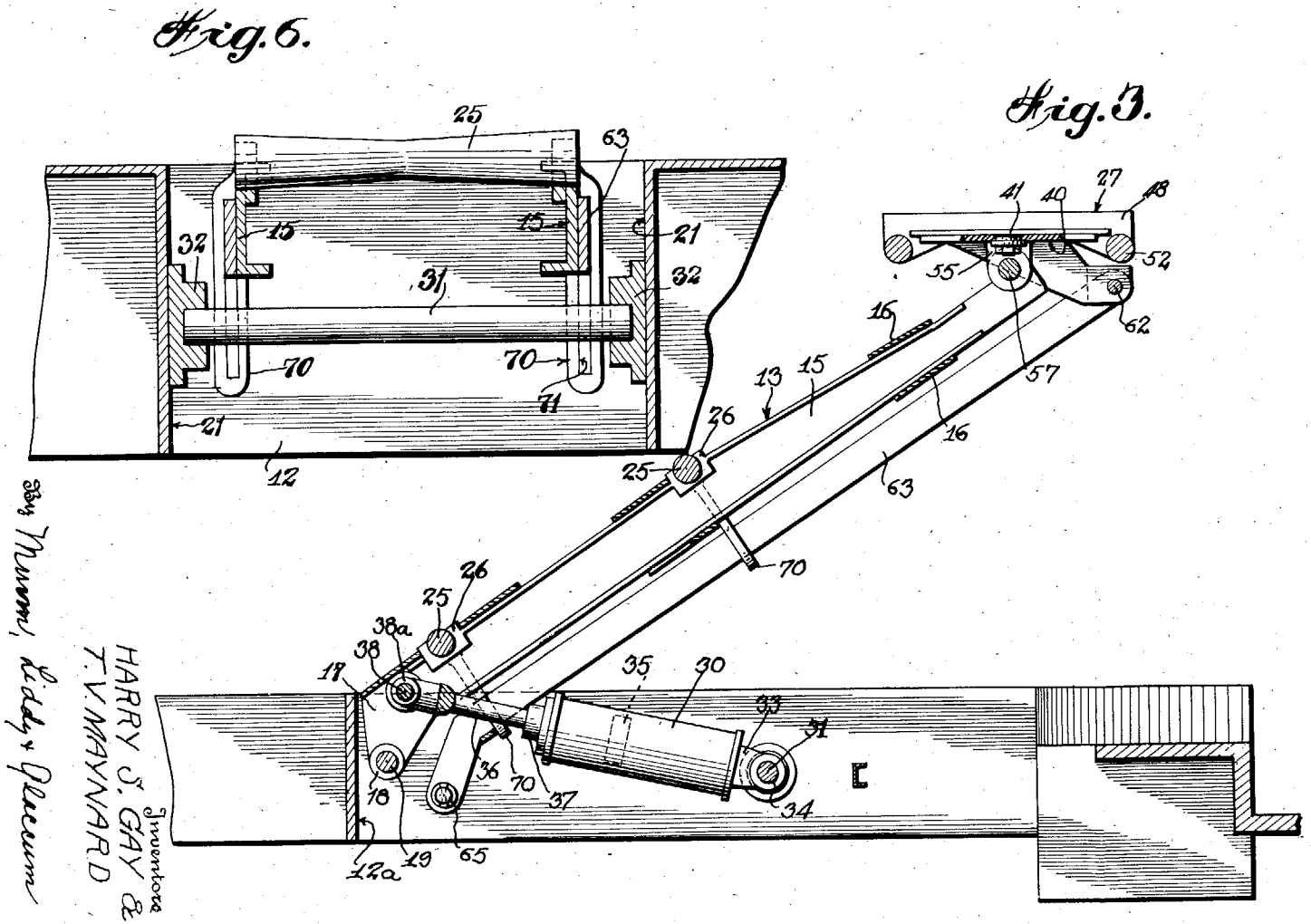
Inventors
HARRY S. GAY &
T. V. MAYNARD
By Munn, Liddy & Glascum
Attorneys Reissued Oct. 14, 1947

Re. 22,927

UNITED STATES PATENT OFFICE 22,927

TIMBER SETTING MACHINE

Harry Samuel Gay, Mount Gay, and Thomas V. Maynard, Williamson, W. Va.

Original No. 2,408,387, dated October 1, 1946, Serial No. 575,706, February 1, 1945. Application for reissue March 12, 1947, Serial No. 734,140

14 Claims. (Cl. 214—130)

This invention relates to timber setting machines.

An object of the invention is the provision of a truck for carrying timbers and for raising the timbers which are to be applied to the roof of a mine and fixed in place for supporting the roof thereof.

Another object of the invention is the provision of a machine for raising and holding timbers in place until they are securely supported by props of the usual type, said machine including a wheeled truck for carrying the timbers to the mine, with the truck body having an elongated slot in which is substantially housed a hoisting arm with means being employed for raising the arm which is provided with a saddle for supporting a timber, said saddle having a rotatable mounting so that the timber may be placed in position as desired.

A further object of the invention is the provision of a machine including a truck having an elongated slot for housing a hoisting arm, means being provided for raising the arm until the timber located in a saddle at the free end of the arm has been applied to the proper position on the inner wall of a mine or tunnel, means being employed for retaining the timber in position until said timber has been fixed in place, said saddle being rotatably mounted on a table so that the timber may be moved through any angle in a horizontal plane, said saddle being adapted to be retained in a horizontal position at all times during the raising or lowering of the arm, the housing of the hoisting arm within the slot in the truck permitting timbers to be carried on the truck to the points where said timbers are applied to the walls of the roof of the mine or tunnel.

This invention will be best understood from a consideration of the following detailed description, in view of the accompanying drawings forming a part of the specification; nevertheless, it is to be understood that the invention is not confined to the disclosure, being susceptible to such changes and modifications as define no material departure from the salient features of the invention as expressed in the appended claims.

In the drawings:

Fig. 2 is an elongated vertical section taken along the line 2—2 of Fig. 1, showing the elevator in an inoperative position.

Fig. 3 is a vertical section similar to that shown in Fig. 2, showing the elevator in raised position.

Fig. 4 is a fragmentary enlarged side view of the end of the elevator, showing a saddle for timbers mounted on the free end of the elevator.

Fig. 5 is a transverse vertical section taken along the line 5—5 of Fig. 4.

Fig. 6 is a transverse vertical section taken along the line 6—6 of Fig. 2.

Figure 1:
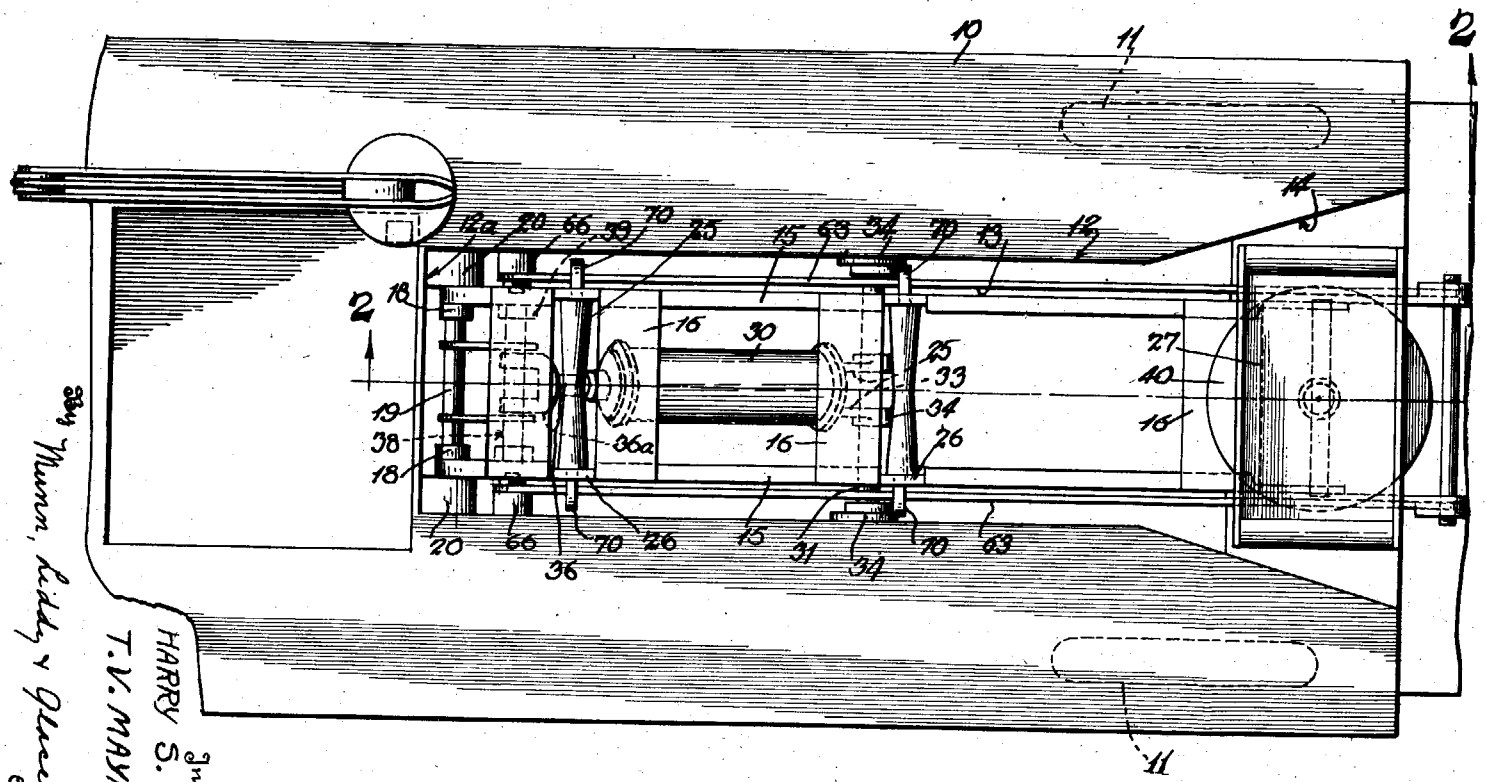
Fig. 1 is a fragmentary plan view of a truck showing an elevator for applying timbers to the roof of a mine, said elevator normally being housed in a pocket or slot in the bed of the truck.

Referring more particularly to the drawings, 10 designates the flat bed of a truck upon which timbers may be carried. The truck is of the self propelled type, although the complete truck is not shown. The rear end is supported by wheels 11 of well known construction. The bed 10 is provided with an elongated slot 12 extending longitudinally thereof, and this slot forms a housing for an elevator or crane generally designated by the numeral 13. The rear open end of the slot is flared as shown at 14 for a purpose which will be presently explained.

The inner end 12*a* of said slot terminates midway between the front and rear end of the bed 10, and is of sufficient length to fully house the elevator 13 when located in an inoperative position. The elevator or crane is of sufficient length that logs may be raised thereby for applying timbers to the roof of a mine tunnel or other form of chamber.

A pair of metal U-beams 15 are disposed in parallel relation and are connected together at their tops and bottoms by metal plates 16 rigidly secured to the upper and lower faces of said beams as shown more particularly in Figs. 1 and 3. The inner ends of these beams are bent downwardly as shown at 17, and are provided with collars 18 receiving an axle 19 which has its ends mounted in blocks or supports 20 formed on the side walls 21 of the channel or slot 12. The connected U-beams 15 are swingably mounted on the axle 19.

A plurality of rollers 25 have their end mounted in bearings 26 connected to the U-beams 15. The rollers have their greater diameters at their ends, and they taper from the outer end to a narrow central portion. Since these rollers extend slightly above the upper edges of the U-beams they may be employed for rolling a log longitudinally of the hoisting arm or crane 13 on to a saddle generally designated by the numeral 27.

The hoisting arm 13 may be elevated in any approved manner, although in the present instance there is illustrated a pneumatic device for the purpose. This pneumatic device includes a cylinder 30 pivoted on an axle 31 which has its ends mounted in bearings 32 (Fig. 6) secured to the side walls 21 of the channel or longitudinal slot 12, formed in the bed 10. Arms 33 secured to the bottom of the cylinder 30 have a bearing 34 mounted on the axle 31 so that the cylinder is swingably mounted on said axle. The usual piston 35 is mounted in the cylinder 30 and is connected to a piston rod 36 which passes through a bushing 37 on the inner free end of the cylinder 30. The outer end of the piston rod 36 is provided with a fork 36a having bearings 38a mounted on a rod 38 which is carried by bearings 39 secured to the inner faces of the beams 15. Thus, it will be seen that when water under pressure or air under pressure is forced into the outer or pivoted end of the cylinder 30 against the piston 35, the rod 36 will be forced outwardly and raise the hoisting arm 13 from its position within the channel or slot 12 of the bed 10.

The saddle 27 for holding timbers against the roof of a room or space such as a tunnel in a mine is rotatably mounted in a horizontal plane on the circular table 40 which is hingedly connected to the outer free end of the hoisting arm 13.

As shown more particularly in Fig. 5 the saddle 27 has a base portion 41 which has a centrally disposed pivot pin 42 formed integrally therewith. This pivot pin is located within a centrally disposed passage 43 in the circular table 40. A ring 44 is received by the pin 42 and a nut 45 threaded on to the outer reduced end 46 of the pin 42 retains the saddle 27 in position on the table while permitting the saddle to be rotated in a horizontal plane. The reduced end 46 of the pin 42 extends to a shoulder 47 so that the ring 44 will be engaged by the shoulder for holding the saddle on the table 40, while permitting the saddle to be revolved. The saddle is provided with a pair of longitudinally disposed side bars 48 which have depending portions 49. These depending portions are provided with passages 50 to receive pintles 51 on rollers 52. The diameters of these rollers are sufficiently great that the upper edges of these rollers are in horizontal alinement with the member 41 of the saddle so that logs may be moved back and forth until properly centered on the saddle before the hoisting arm 13 is raised.

The table 40 is provided with a pair of depending ears 55 which have bearings 56 receiving a rod 57 carried by the outer free ends of the beams 15 for pivotally mounting the table 40 and likewise the saddle 27 on the outer end of the hoisting arm.

A pair of brackets 60 also extend downwardly and rearwardly from the table 40 and are provided with passages 61 to receive a rod 62. The outer free ends of controlling bars 63 have pivotal connections with the rod 62. A bracket 58 projects outwardly and downwardly from the members 60 and in parallel relation therewith and is provided with a passage to receive the free ends of the rod 62. Cotter pins 59 in the ends of the rod 62 maintain said rod in position. The outer ends of the bars 63 are located between the members 60 and the brackets 58.

These controlling bars extend downwardly and are provided with angularly bent ends 64 which are pivotally mounted on a rod 65 carried by bearings 66 which are secured to the side walls 21 of the channel 12. Thus, it will be seen that when the hoisting arm 13 is raised the bars 63 will likewise be raised, but due to the particular construction of the ends of these bars and the connections between the walls of the channel on the one end and the brackets 60 depending from the table 40 on the other end causes the saddle 27 to be maintained in a horizontal position at all times as will be presently explained.

Referring more particularly to Figs. 3, 5 and 6, it will be noted that guides 70 are carried by the beams 15. Each guide is provided with a slot 71 to receive one of the bars 63 for maintaining said bars in close association with the beams 15 and in parallel relation during the raising or lowering of the hoisting arm 13. Pairs of these guides are disposed adjacent the rollers 25 which are located at the inner end of the hoisting arm and at an intermediate portion.

A seat 75 (Figs. 2 and 3) is located at the outer end or flared portion of the channel 12 for supporting the outer free end of the hoisting arm 13, in its lowered position when the hoisting arm has been substantially housed within the channel 12.

The operation of our device is as follows:

The wheeled truck having a flat part or body 10 is adapted to be supplied with a number of timbers which are to be applied to the roof of a mine tunnel and the truck is adapted to be propelled by a power plant, not shown, located at the front of the truck. This power plant also is adapted to supply fluid under pressure to the cylinder 30 at a point adjacent the outer end thereof where it is pivoted on the rod 31.

The piston 30 is located at an angle to the horizontal so that the point of connection, in this instance the rod 38, with the hoisting arm 13 is above the horizontal level of the rod 31. Thus, when the piston 35 is operated, it will force the arm 13 upwardly, thereby carrying a timber which is located within the saddle 27 and in balanced relation up to the roof, and this timber will be maintained in place until the workmen supply the necessary supports for the timber.

The saddle 27 has been defined as being rotatable on the table 40 so that it is not essential to position the truck along a line which is centrally disposed of the tunnel, because the saddle may be revolved in a horizontal plane until the timber is in a proper position to be applied.

The saddle is maintained in a horizontal position at all times since the bars 63 are so formed and positioned with respect to the hoisting arm 13 that the outer ends of the bars through the brackets 60 will maintain the horizontal position of the saddle during its ascent or descent.

It will be noted from Fig. 2 that the hoisting arm and its associated parts are substantially housed within the channel 12 when the hoisting arm is in its lower position so that it is possible to employ the truck for transporting logs or other material thereon. The saddle 27, however, extends above the upper surface of the bed 10 at the rear end, and therefore it will not interfere with the transportation of materials on the truck.

We claim:

1. A timber setting machine comprising a truck having a flat bed provided with an elongated slot extending longitudinally of and through the bed with one end opening through the rear end of the bed of the truck, a hoisting arm normally housed within the slot, means pivotally mounting the inner end of the arm within the inner end of said slot, means for raising the free end of the arm, a saddle pivotally mounted on the free end of said arm and adapted to receive and support a timber, a seat at the outer end of the slot and supporting the saddle in a horizontal position, and a rod having a bent end pivoted on a side wall of the slot, the other end of said rod having pivotal connections with the saddle so that when the arm is raised the saddle will be maintained in a horizontal position.

2. In a mine timbering machine, the combination with a vehicle chassis having a timber carrying platform provided with a longitudinal slot, vertical walls at each side thereof, of a frame composed of spaced parallel arms lying in the slot, and pivoted at one end to the sidewalls thereof, a hydraulic cylinder located in the space between said arms also pivoted between said walls and having a piston connected to the frame for elevating its free end, and a timber carrying table mounted on the free end of the frame.

3. In a mine timbering machine, the combination with a vehicle chassis having a timber carrying platform provided with a longitudinal slot, vertical walls at each side thereof, of a frame composed of spaced parallel arms lying in the slot and pivoted at one end to the sidewalls thereof, timber rollers thereon arranged with their upper edges extending above the platform, of a timber carrying table on the free end of the frame carrying rollers in alinement with those on the frame and means for raising the frame on its pivot.

4. In a mine timbering machine, the combination with a vehicle chassis having a timber carrying platform provided with a longitudinal slot, vertical walls at each side thereof, of a frame composed of spaced parallel arms lying in the slot having their upper edges for approximately one-half their length located in substantial alinement with the platform and for the remainder of their length inclined downwardly, of a timber carrying table rotatable on the free end of the frame normally lying approximately in the plane of the platform, alined sets of loading rollers on the frame and table arranged with their upper edges extending above the level of the platform and means for raising the free end of the frame.

5. In a mine timbering machine, the combination with a vehicle chassis having a timber carrying platform provided with a longitudinal slot having a widened rear end, vertical walls at each side of the slot at its inner end, and a seat extending across the open end of the slot below the platform, of a frame pivoted at one end between said side walls composed of spaced arms resting at their free ends on said seat having their upper edges depressed below the platform, a timber carrying table journaled on the free end of the frame within the slot enlargement in substantial alinement with the platform, timber rollers on the frame and table, and means for elevating the free end of the frame.

6. In a mine timbering machine, the combination with a vehicle chassis having a timber carrying platform provided with a longitudinal slot, vertical walls at each side thereof, of a load frame composed of spaced parallel arms lying in the slot, a timber carrying turntable mounted on the free end of the frame, a second similar frame composed of arms also pivoted at their inner ends to the walls of the slot and located between the latter and the arms of the first-mentioned frame and connected to the turntable and serving to maintain it in a horizontal position, said arms and turntable being arranged to normally position the table in substantial alinement with the chassis platform, a hydraulic cylinder lying between the arms of the load carrying frame having a piston operating on the latter to elevate its free end.

7. In a mine timbering machine, the combination with a vehicle chassis having a timber carrying platform provided with a longitudinal slot, of a boom lying in the slot and pivotally connected to the vehicle, fluid pressure means also located in the slot and pivotally connected to the vehicle and to said boom for elevating the free end thereof and a timber carrying turn-table mounted on the free end of the boom and maintained in horizontal position.

8. In a mine timbering machine, the combination with a vehicle chassis having a timber carrying platform provided with a longitudinal slot, of a boom lying in the slot and pivotally connected to the vehicle, rollers mounted crosswise on the upper edge of the boom and a turn-table carried on the free end thereof, said rollers lying in substantial alinement with the plane of the platform when the boom is in its lowered position, and a turntable in alinement with the rollers in position to receive a timber, moved lengthwise of the boom, said turn-table being rotatable when the boom is elevated to position a timber at an angle to its loading position, and fluid pressure means pivotally connected to the vehicle and to the boom for elevating its free end.

9. In a machine for setting overhead timbers in mine workings, the combinaiton with a vehicle having a slotted deck, of a boom lying in the slot and pivoted at its lower end to the vehicle, a platform pivoted to the outer end of the boom, a member also lying in said slot connected to the platform and vehicle and serving when the boom is moved above the deck to move the boom platform in horizontal position, of a timber carrying turn-table journaled on said platform, and fluid pressure means carried on the vehicle and connected to the boom for elevating its outer free end.

10. A machine for setting timbers overhead in mine workings, comprising a vehicle having a body provided with a horizontal bed for carrying timbers to such workings and provided with vertical side walls having a slot between them extending lengthwise of the vehicle, a boom pivotally supported at its inner end by the vehicle body on a fixed horizontal axis and lying within said slot when its free end is lowered, a platform pivotally supported on a horizontal axis by the outer free end of said boom, a horizontal turn-table supported by said platform and journaled on a vertical axis and formed to receive timbers individually from said bed when said boom is lowered, a rigid member extending lengthwise of said boom and pivotally supported at its inner end by the vehicle body on a fixed axis at a side of said boom axis and pivotally connected at its outer end to said platform at a side of said platform axis to maintain the platform horizontal in all positions of said boom, and power mechanism borne by the vehicle and connected to said boom for elevating its free end to position against the roof of a mine working a timber carried by said turntable.

11. A machine for setting timbers overhead in mine workings, comprising a vehicle having a body provided with a horizontal bed for carrying timbers to such workings and provided with vertical side walls having a slot between them extending lengthwise of the vehicle, a boom having its inner end pivotally supported by said side walls on a horizontal axis and lying within said slot when its outer free end is lowered, a platform pivotally supported on a horizontal axis by the outer free end of said boom, a horizontal turn-table supported by said platform and journaled on a vertical axis and formed to receive timbers individually from said bed when said boom is lowered, a rigid member extending lengthwise of said boom and pivotally supported at its inner end by said side walls on a fixed axis at a side of said boom axis and pivotally connected at its outer end to said platform at a side of said platform axis to maintain the platform horizontal in all positions of said boom, and power mechanism borne by the vehicle and connected to said boom for elevating its free end to position against the roof of a mine working a timber carried by said turn-table.

12. A machine for setting timbers overhead in mine workings, comprising a vehicle having a body provided with a horizontal bed for carrying timbers to such workings and provided with vertical side walls having a slot between them extending lengthwise of the vehicle, a boom having spaced parallel arms pivotally supported on a horizontal axis at their inner ends by said side walls and lying within said slot when the outer free end of the boom is lowered, a platform pivotally supported on a horizontal axis by the outer free end of said boom, a horizontal turn-table supported by said platform and journaled on a vertical axis and formed to receive timbers individually from said bed when said boom is lowered, a rigid member extending lengthwise of said boom and pivotally supported at its inner end by said side walls on a fixed axis at a side of said boom axis and pivotally connected at its outer end to said platform at a side of said platform axis to maintain the platform horizontal in all positions of said boom, and power mechanism borne by the vehicle and connected to said boom for elevating its free end to position against the roof of a mine working a timber carried by said turn-table.

13. A machine for setting timbers overhead in mine workings, comprising a vehicle having a body provided with a horizontal bed for carrying timbers to such workings and provided with vertical side walls having a slot between them extending lengthwise of the vehicle, a boom pivotally supported at its inner end by the vehicle body on a fixed horizontal axis and lying within said slot when its free end is lowered, a platform pivotally supported on a horizontal axis by the outer free end of said boom, a horizontal turn-table supported by said platform and journaled on a vertical axis and formed to receive timbers individually from said bed when said boom is lowered, a rigid member extending lengthwise of said boom and pivotally supported at its inner end by said side walls on a fixed axis at a side of said boom axis and pivotally connected at its outer end to said platform at a side of said platform axis to maintain the platform horizontal in all positions of said boom, and fluid pressure mechanism borne by the vehicle below said boom and connected to the boom for elevating its free end to position against the roof of a mine working a timber carried by said turn-table.

14. A machine for setting timbers overhead in mine workings, comprising a vehicle having a body provided with a horizontal bed for carrying timbers to such workings and provided with vertical side walls having a slot between them extending lengthwise of the vehicle, a boom pivotally supported at its inner end by the vehicle body on a fixed horizontal axis and lying within said slot when its free end is lowered, a platform pivotally supported on a horizontal axis by the outer free end of said boom, a horizontal turn-table journaled on a vertical axis on said platform and formed to receive timbers individually from said bed when said boom is lowered, a rigid member extending lengthwise of said boom and pivotally supported at its inner end by the vehicle body on a fixed axis at a side of said boom axis and pivotally connected at its outer end to said platform at a side of said platform axis to maintain the platform horizontal in all positions of said boom, a fluid pressure mechanism including a cylinder pivotally connected to the vehicle below said boom and a piston movable within said cylinder, said piston having connections between it and the boom for elevating the outer free end of the boom to position against the roof of a mine working a timber carried by said turn-table.

HARRY SAMUEL GAY.
THOMAS V. MAYNARD.

REFERENCES CITED

The following references are of record in the file of this patent:

UNITED STATES PATENTS

| Number | Name | Date |
|---|---|---|
| 1,141,928 | Brown | June 8, 1915 |
| 2,044,857 | Pfauser | June 23, 1936 |
| 2,377,279 | Stewart | May 29, 1945 |